US008073886B2

(12) United States Patent
Ou-Yang et al.

(10) Patent No.: US 8,073,886 B2
(45) Date of Patent: Dec. 6, 2011

(54) NON-PRIVILEGED ACCESS TO DATA INDEPENDENT OF FILESYSTEM IMPLEMENTATION

(75) Inventors: Darwin Ou-Yang, Redmond, WA (US); Matt Garson, Seattle, WA (US); Ravinder S. Thind, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/390,357

(22) Filed: Feb. 20, 2009

(65) Prior Publication Data
US 2010/0228797 A1    Sep. 9, 2010

(51) Int. Cl.
G06F 7/00 (2006.01)
G06F 17/30 (2006.01)
G06F 12/00 (2006.01)

(52) U.S. Cl. .................. 707/831; 707/783; 707/803

(58) Field of Classification Search ............... 707/999.2, 707/999.205, 999.009, 999.1, 999.101, 999.102, 707/821–831, 781–788, 802, 803, 790
See application file for complete search history.

(56) References Cited

U.S. PATENT DOCUMENTS

| 5,459,867 A | 10/1995 | Adams et al. |
| 5,918,047 A | 6/1999 | Leavitt et al. |
| 5,974,547 A * | 10/1999 | Klimenko ........................ 713/2 |
| 6,185,678 B1 | 2/2001 | Arbaugh et al. |
| 6,363,400 B1 * | 3/2002 | Chtchetkine et al. ............... 1/1 |
| 6,598,157 B1 | 7/2003 | McKee |
| 6,952,698 B2 | 10/2005 | Delaire et al. |
| 6,959,304 B1 * | 10/2005 | Teig et al. ..................... 707/713 |
| 6,963,951 B2 | 11/2005 | Ng et al. |
| 6,993,581 B1 | 1/2006 | Blumenau et al. |
| 7,120,786 B2 | 10/2006 | Miller et al. |
| 7,143,288 B2 | 11/2006 | Pham et al. |
| 7,174,421 B2 | 2/2007 | Ehrlich |
| 7,272,613 B2 * | 9/2007 | Sim et al. ................. 707/999.01 |
| 7,281,111 B1 | 10/2007 | Blumenau |
| 7,437,387 B2 | 10/2008 | Cohen et al. |
| 7,502,898 B2 | 3/2009 | Blumenau et al. |
| 2003/0037237 A1 | 2/2003 | Abgrall et al. |
| 2003/0066062 A1 * | 4/2003 | Brannock et al. ............. 717/169 |

(Continued)

FOREIGN PATENT DOCUMENTS
WO   WO2008051679   5/2008

OTHER PUBLICATIONS

Graf, et al., "A Capability-Based Transparent Cryptographic File System", retrieved on Dec. 17, 2008 at <<http://ieeexplore.ieee.org/stamp/stamp.jsp?arnumber=01587522>>, Proceedings of the 2005 International Conference on Cyberworlds (CW 2005), IEEE, 2005, 8 pages.

(Continued)

Primary Examiner — Brent Stace
(74) Attorney, Agent, or Firm — Lee & Hayes, PLLC

(57) ABSTRACT

An application programming interface (API) module provides access to data, independent of filesystem implementation in a non-privileged user mode. A discovery volume having a filesystem recognizable by an operating system has cover files which prevent damage to data stored in an unrecognizable primary volume. The discovery volume also includes a data access API available for execution in a non-privileged user mode to render the primary volume accessible by operating systems which would otherwise find the primary volume unrecognizable.

17 Claims, 9 Drawing Sheets

U.S. PATENT DOCUMENTS

| | | | |
|---|---|---|---|
| 2003/0126426 A1* | 7/2003 | Frye, Jr. | 713/2 |
| 2003/0182312 A1* | 9/2003 | Chen et al. | 707/200 |
| 2004/0107422 A1* | 6/2004 | Cabrera et al. | 719/310 |
| 2005/0004925 A1 | 1/2005 | Stahl et al. | |
| 2005/0228937 A1 | 10/2005 | Karr et al. | |
| 2006/0080397 A1 | 4/2006 | Chene et al. | |
| 2006/0179261 A1 | 8/2006 | Rajan | |
| 2006/0218165 A1 | 9/2006 | Vries et al. | |
| 2006/0265605 A1 | 11/2006 | Ramezani | |
| 2007/0180239 A1 | 8/2007 | Fujibayashi et al. | |
| 2007/0206224 A1* | 9/2007 | Nagashima et al. | 358/1.16 |
| 2008/0104148 A1 | 5/2008 | Schwaab et al. | |

OTHER PUBLICATIONS

Strunk, et al., "Self-Securing Storage: Protecting Data in Compromised Systems", retrieved on Dec. 17, 2008 at <<http://ieeexplore.ieee.org/stamp/stamp.jsp?arnumber=01264933>>, Proceedings of the Foundations of Intrusion Tolerant Systems (OASIS 2003), IEEE, 2003, 15 pages.

"Translucency Overlay File System LKM", retrieved on Dec. 17, 2008 at <<http://sourceforge.net/projects/translucency/>>, SourceForge.net, pp. 1-2.

Halderman, et al., "Lest We Remember: Cold Boot Attacks on Encryption Keys", retrieved on May 28, 2008 at <<http://citp.princeton.edu/pub/coldboot.pdf>>, Apr. 2, 2008, revision 2.1, pp. 1-24.

McDonald, et al., "StegFS: A Steganographic File System for Linux" retrieved on May 28, 2008 at <<http://docs.ksu.edu.sa/PDF/Articles38/Article380600.pdf>>, Proc Information Hiding, Sep. and Oct. 1999, pp. 463-477.

Final Office Action for U.S. Appl. No. 12/257,938, mailed on Jun. 16, 2011, Karan Mehra, "Virtualized Boot Block With Discovery Volume", 15 pgs.

Weinhold, "Design and Implementation of a Trustworthy File System for L4", retrieved on May 28, 2008 at <<http://os.inf.tu-dresden.de/papers_ps/weinhold-diplom.pdf>>, Mar. 23, 2006, pp. IX to XV and 1-74.

White, et al., "LegionFS: A Secure and Scalable File System Supporting Cross-Domain High-Performance Applications", retrieved on May 28, 2008 at <<http://citeseer.ist.psu.edu/cache/papers/cs/23870/http:zSzzSzlegion.virginia.eduzSzpaperszSzSC2001.pdf/white01legionfs.pdf>>, ACM/IEEE 2001 Conf on Supercomputing, Nov. 2001, 10 pgs.

* cited by examiner

NON-PRIVILEGED ACCESS TO DATA INDEPENDENT OF FILESYSTEM IMPLEMENTATION

BACKGROUND

Access to data across multiple filesystems is a significant concern for computer users. Users may encounter difficulties when trying to access filesystems supported in a source system but not supported in an accessing system. For example, an older version of an operating system may be unable to access a volume created in a newer version of the operating system because of new features present in the filesystem of the newer version, which render the newer version inaccessible to the older version.

Attempts to access volumes containing a filesystem incompatible with the accessing device may have unintended consequences for users. The accessing system may not recognize the filesystem of the source system and present the volume as "raw," or apparently unrecognized. At the least, the accessing system may not be able to determine that data is present on that volume. At worst, an accessing system which fails to recognize the volume may prompt the user to reformat the entire volume, causing loss of the data in the volume.

Furthermore, loading of special drivers or software to allow access to a volume ordinarily unrecognizable by an operating system has traditionally required execution in kernel mode, thus running afoul of security policies which limit execution to user mode.

SUMMARY

An original boot region (or boot sectors) of a primary volume on a computer readable storage medium is defined as a virtualized region. The virtualized region and its data are moved to another location on the primary volume. A discovery volume is initialized, which takes the place of the virtualized region, using an application programming interface (API). The discovery volume acts as an overlay for the primary filesystem and comprises a filesystem recognizable by a desired array of accessing devices. The discovery volume includes one or more pointers in its boot region, which lead to the virtualized region relocated to accommodate the discovery volume at the beginning of the volume. For example, a discovery volume using a File Allocation Table (FAT) filesystem contains boot region entries consistent with a FAT boot region, and one or more pointers to the relocated virtualized boot region of the primary filesystem.

The discovery volume stores a data access application programming interface (API) configured to allow an operating system of an accessing system to read a primary volume filesystem which would otherwise be unrecognizable by the operating system. This data access API executes in a non-privileged user mode, allowing its execution without requiring privileged kernel mode access. Use of an overlay comprising a commonly recognized format, for example a FAT volume, thus renders the primary filesystem on the volume independent of a source system. The discovery volume may also contain an information file for users, alerting them to the presence of data on the volume.

Cover files protect data in the primary filesystem when the primary filesystem is unrecognized by the accessing system. Cover files are file entries in the discovery volume filesystem which make it appear to the accessing system as though the discovery volume claims space actually used by the primary filesystem. Thus, while a discovery volume may actually utilize a small number of sectors on the disk, an accessing system may see the cover files of the discovery volume consuming the entire space.

When attempting to mount a disk containing a primary filesystem unrecognized by the accessing system, the accessing system will surface the discovery volume to the user. Based on the information presented in that discovery volume, a user may ascertain that another filesystem is present. Additionally, the presence of the discovery volume and cover files prevents an erroneous determination that the primary volume is "raw" or unformatted and a resulting presentation of a prompt to reformat the volume while also preventing unwanted overwriting of otherwise unrecognizable data in the primary volume.

Thus, the discovery volume is visible to a wide array of accessing systems, the cover files prevent accidental overwrite of data otherwise unrecognizable by the accessing systems, and the data access API allows the accessing systems to access the primary volume storing primary data using a non-privileged user mode.

This summary introduces the subject matter described below in the Detailed Description. This summary is not intended to identify essential features of the claimed subject matter, nor is it intended for use in determining the scope of the claimed subject matter.

BRIEF DESCRIPTION OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

Introduction

Figure 1:
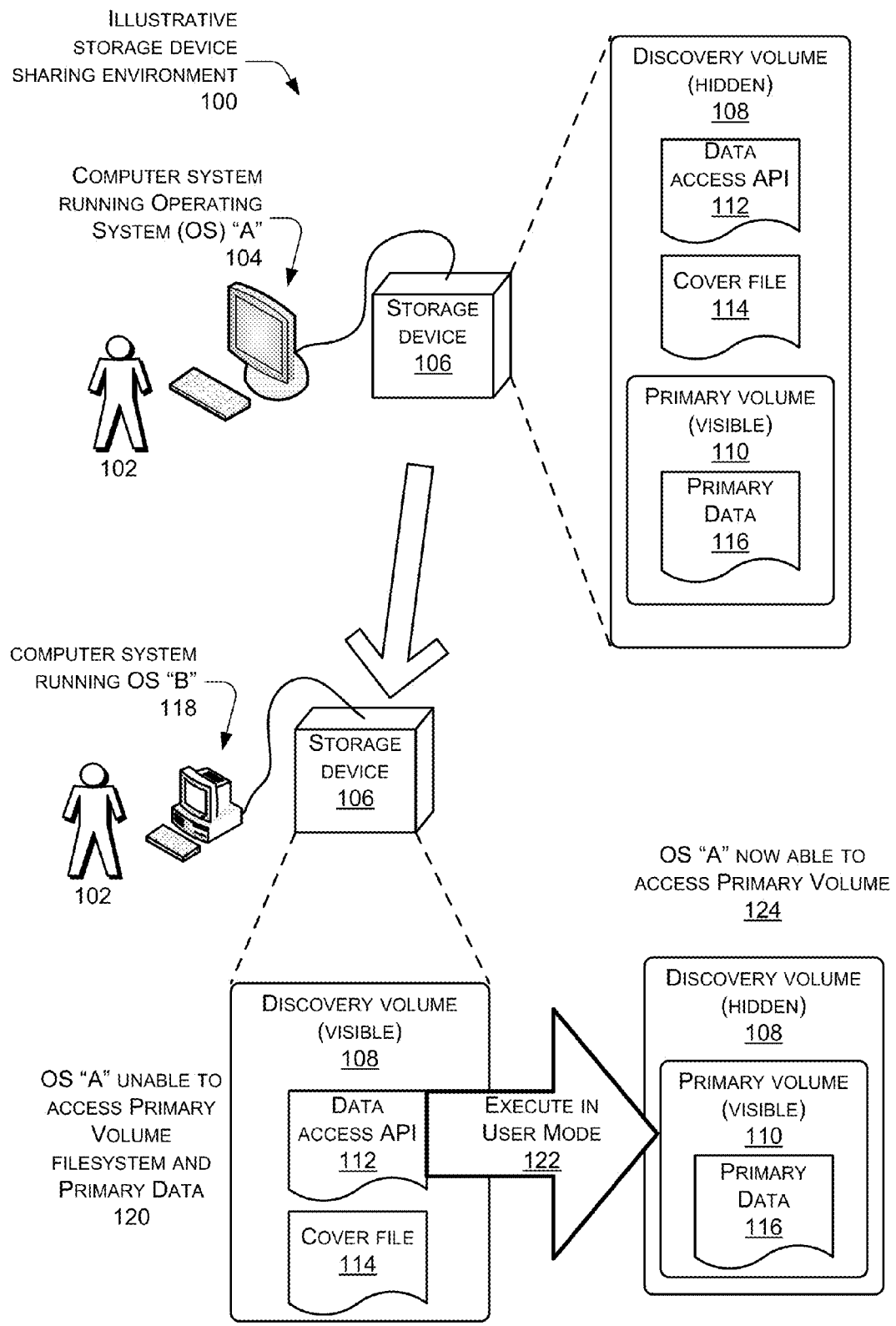
FIG. 1 is a diagram of an illustrative storage device sharing environment.

As noted above, when a filesystem on a volume is unrecognized, a user will be unable to access the data stored in the volume and may even be prompted to reformat or otherwise erase the data stored on that volume which appears raw. This application describes an application programming interface (API) and system to provide access to data, independent of filesystem implementation, in a non-privileged user mode.

The data at the beginning of a volume of a computer readable storage medium, including an original filesystem boot region, is defined as a virtualized region. The virtualized region is first moved to another location in a primary volume. A discovery volume is then written to the recently vacated space at the beginning of the volume. The discovery volume boot region contains entries consistent with a widely recognized filesystem boot region, including cover files and pointers to the virtualized region. The cover files claim blocks used by the primary volume filesystem as being used in the discovery volume filesystem. In other words, the cover files make it appear to the accessing system as though the discovery volume uses space actually used by the primary filesystem. Thus, while a discovery volume may actually utilize a small number of sectors on the disk, an accessing system may see cover files of the discovery volume consuming the entire space. This makes the entire volume appear to be in use, preventing accidental formatting or inadvertent overwrites of data. Cover files also provide access to the underlying volume.

The discovery volume stores a data access application programming interface (API) configured to allow the operating system of the accessing system to recognize a filesystem, which would otherwise be unrecognizable by the accessing operating system. This data access API executes in a non-privileged user mode, allowing its execution without requiring privileged kernel mode access, which may be restricted because of security policies or other concerns.

The discovery volume may also contain one or more information files describing the underlying primary filesystem. The information files may be visible to users and contain data which is human-readable, machine-readable, or both, as to the nature of the other volumes on the disk.

In one implementation, FAT format may be used for the discovery volume filesystem. Because of the FAT format's wide support, the discovery volume would be visible across a wide range of platforms and operating systems. However, any filesystem may be utilized which provides the desired visibility commonality across potential accessing systems.

Thus, when an accessing system attempts to mount a physical disk containing an unrecognizable primary volume, the accessing system will find the discovery volume accessible. The presence of the discovery volume prevents the accessing system from prompting the user to reformat the volume. The presence of the cover files prevents an inadvertent overwrite of data on the unsurfaced (that is, an unrecognized) primary volume, while the data access API gives an accessing system the ability to recognize and access the primary volume in a non-privileged user mode.

Illustrative Storage Device Sharing Environment

FIG. 1 is an illustrative storage device sharing environment 100. A user 102 is shown using computer system 104 running operating system "B." Computer 104 is connected via a cable, wireless, network, etc., to storage device 106.

Storage device 106 may be any computer-readable storage medium including random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device. For example, storage device 106 may be a removable flash memory drive or a removable hard drive which the user may carry to other computers.

Stored on storage device 106 is a discovery volume 108 which contains a primary volume 110. Discovery volume 108 is hidden, because primary volume 110 is recognized and thus accessible by operating system A. Within discovery volume 108 is primary volume 110. Discovery volume 108 comprises a data access API 112 and a cover file 114. Within primary volume 110 is primary data 116. Primary data 116 may comprise data stored by computer 104 or other computers and may include data files such as documents, multimedia files, etc.

Computer system 118 running operating system "B" is then connected to storage device 106. Operating systems A and B may be different operating systems, or different versions of the same operating system. In the illustrated example, operating system B on computer 118 is unable to recognize the filesystem used by operating system A of computer 104, as shown at 120. Thus computer 118 cannot access the primary volume 110. However, operating system B on computer 118 is able to access discovery volume 108 because it uses a filesystem which is visible to operating system B. Thus discovery volume 108 is visible while primary volume 110 is not.

When computer 118 executes the data access API 112 in non-privileged user mode 122, the primary volume 110 and primary data 116 are now accessible along with the discovery volume 108 and its contents, as shown at 124.

Figure 2:
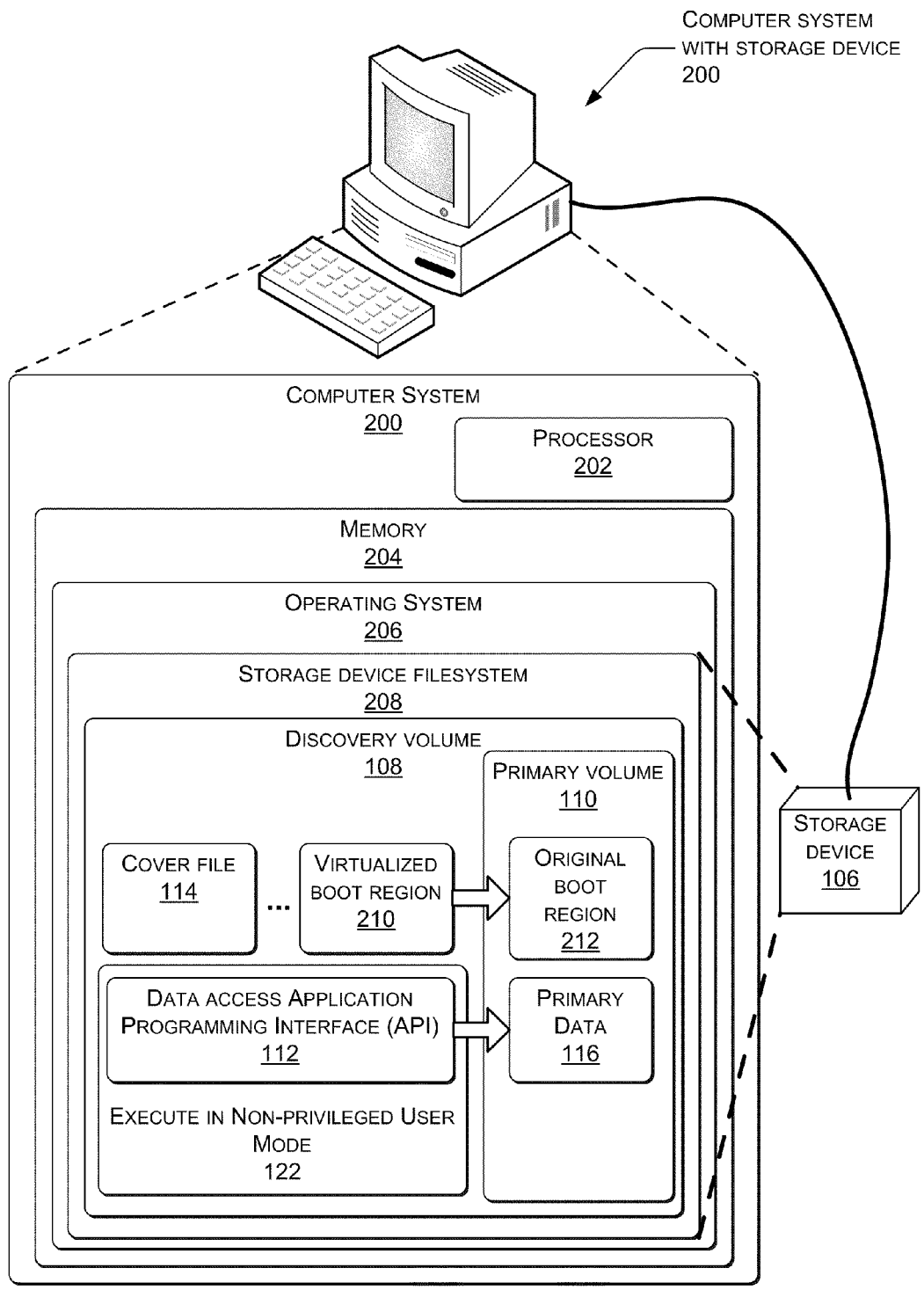
FIG. 2 is a diagram of a computer system with an attached storage device.

FIG. 2 is a diagram of a computer system with an attached storage device 200. Computer system 200 comprises a processor 202 coupled to a memory 204. Stored within memory 204 and configured to execute on processor 202 is an operating system 206. Operating system 206 accesses storage device filesystem 208, which is stored on storage device 106, which is coupled to processor 202. Within storage device filesystem 208 is discovery volume 108. Within discovery volume 108 is cover file 114, virtualized boot region 210, and primary volume 110. The virtualized boot region 210 comprises a discovery volume boot region with a pointer to the original boot area 212, and is described in more detail in FIG. 3 next. Original boot area 212 may be stored in a stash file on primary volume 110.

Also stored on discovery volume 108 is data access API 112, which may be executed in a non-privileged user mode 122 of operating system 206 to allow access to primary data 116.

Discovery Volume Containing a Primary Volume

Figure 3:
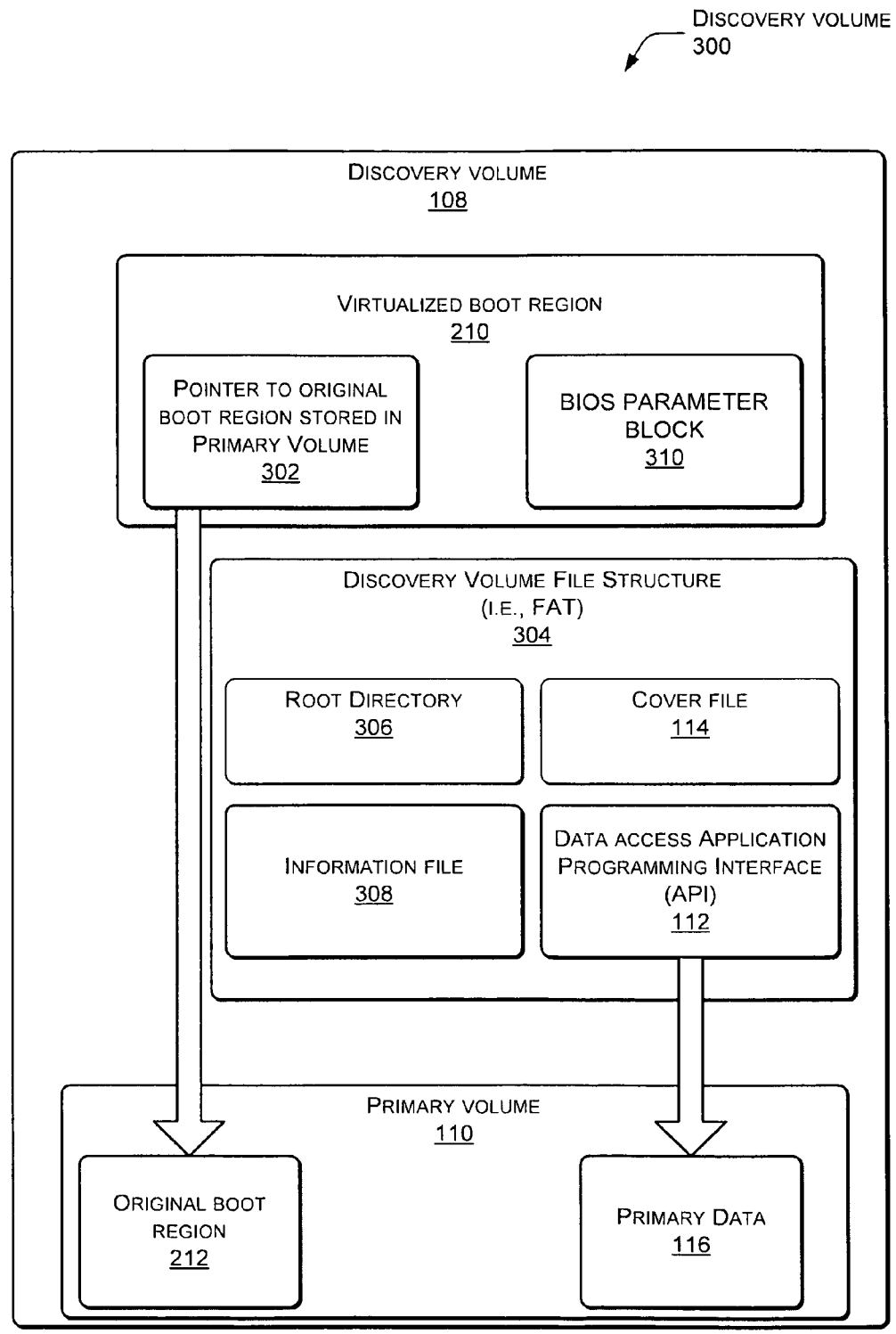
FIG. 3 is a diagram of a primary volume containing a discovery volume.

FIG. 3 is a diagram of a discovery volume 300 containing a primary volume 300. Virtualized boot region 210 of discovery volume 108 comprises a pointer 302 to original boot area 212 located within the primary volume 110. Also within the discovery volume is a discovery volume file structure 304, which may contain a root directory 306 field in the case of a FAT discovery volume filesystem, and a cover file 114. While one cover file is shown, multiple cover files may be used when the number of sectors to be covered exceeds the discovery volume filesystem per-file size limit. For example, if the discovery volume filesystem limits files to a maximum size of 2 gigabytes, but 4 gigabytes needs to be covered, then two cover files of 2 gigabytes each could be used.

At 308, an information file may also be present within the discovery volume 108. This information file may be visible to users and contain human-readable information, machine-readable information, or both, as to the nature of the primary volume on the disk. This information file may be stored in plain text, hypertext markup language (HTML), or other suitable file format. The information file may contain a warning to users that the primary volume contains data, and refer them to a specific Internet address for technical support.

At 112, the data access API 112 stored within discovery volume 108 gives an accessing system the ability to recognize and access the primary volume 110 and primary data 116 when executed in a non-privileged user mode 122 of the operating system 206. Within primary volume 110 is the stash file containing the relocated boot regions of the primary filesystem 212.

Where the discovery volume file structure uses a FAT format, within the virtualized boot region 210 additional information such as a complete BIOS parameter block (BPB) 310 and associated fields may be present. Because some portions of the boot region are not critical for FAT functionality, other data may be stored therein including pointers to metadata of components utilizing the discovery volume. As a result, these fields may be used to store information necessary for the primary volume or other filesystem volumes to function while still leaving a functional FAT discovery volume. When the FAT structure is in use, the boot region contains fields representing the FAT file structure within the discovery volume.

When the FAT file structure is used by the discovery volume, the VolumeLabel field (0x2b) may be updated to contain "EncryptedVolume," or a similar string useful to identify the filesystem of the primary volume 110.

Illustrative Data Access API

Figure 4:
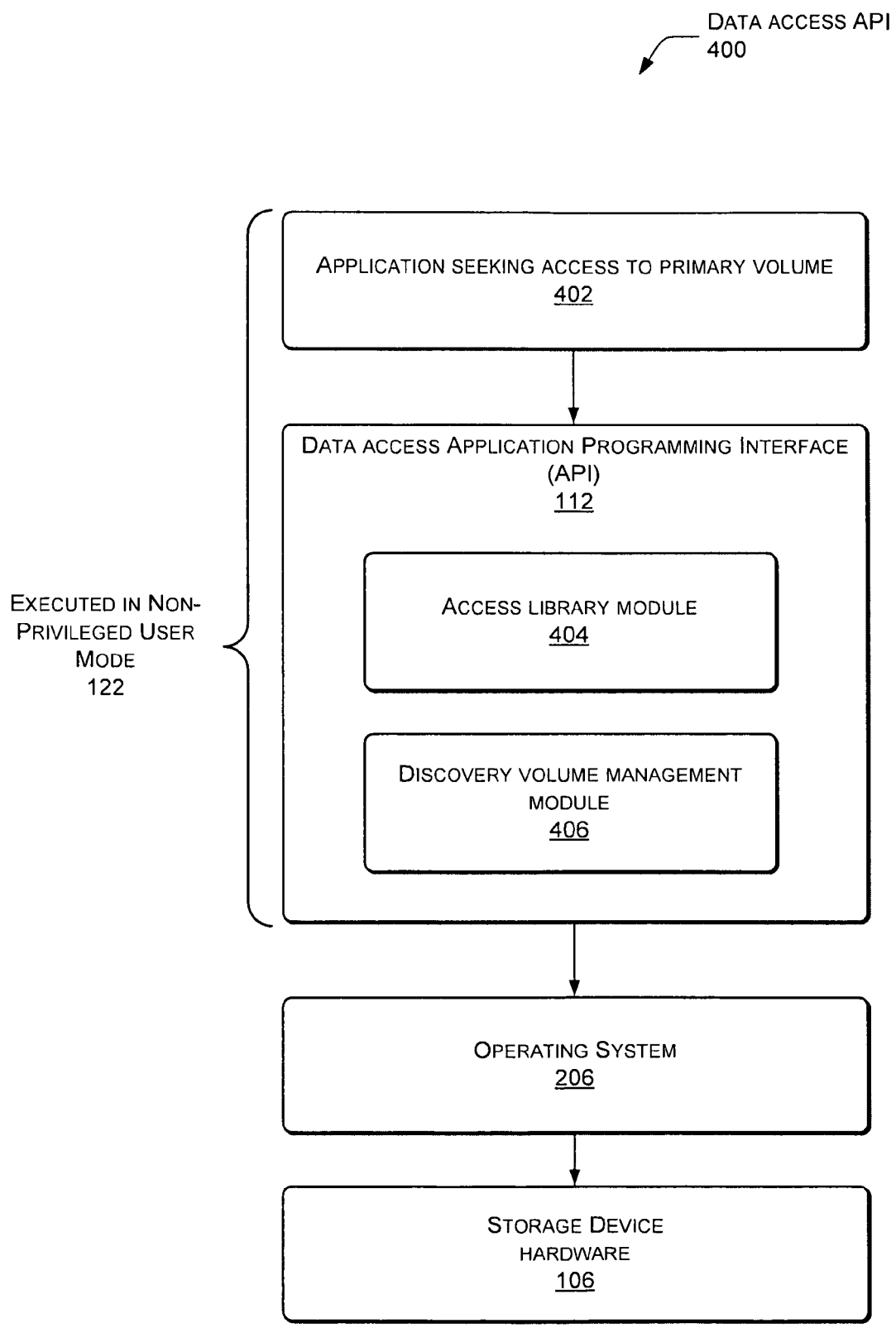
FIG. 4 is a diagram of an illustrative data access API.

FIG. 4 is a diagram of a data access API 400 and its relationship with other components. An application 402 may seek to access data on a primary volume. This application may then call a data access API 112. Data access API 112 may comprise an access library module 404 and a discovery volume management module 406. The data access API 112 may then communicate with operating system 206 which communicates with storage device 106's hardware. Application 402 and data access API 112 may be executed in non-privileged user mode.

The access library module 404 provides the ability to access a primary volume 110 in a non-privileged user mode of an operating system. Illustrative code for one implementation of the cover file creation module 404 in the C language follows:

```
//
// Function implemented by caller that reads a sector run.
//
// The umfs library will call into this function to read ulByteCount
// bytes from the backing store, starting at byte offset ullStartOffset,
// and place the read data in pvReadBuffer.
//
// ulByteCount and ullStartOffset will always be sector aligned, and
// pvReadBuffer will device aligned by umfs before being passed to
// the function.
//
// pvContext will point to the context supplied to the library when
// VOLUME_CONTEXT was passed to the library.
//
// pvReadBuffer will be large enough to contain the requested data.
//
// Any error HRESULT returned from this function will be passed back up
// the call stack.
//
typedef
CDECL
HRESULT
(*PFN_UMFS_READ_SECTOR)(
        PVOID           pvContext,
        ULONGLONG       ullStartOffset,
        ULONG           ulByteCount,
        PVOID           pvReadBuffer
        );
//
// Function implemented by caller that writes a sector run.
//
// The umfs library will call into this function to write ulByteCount
// bytes into the backing store, starting at byte offset ullStartOffset,
// for the data in pvWriteBuffer.
//
// ulByteCount and ullStartOffset will always be sector aligned, and
// pvReadBuffer will device aligned by umfs before being passed to
// the function.
//
// pvContext will point to the context supplied to the library when
// VOLUME_CONTEXT was passed to the library.
//
// pvWriteBuffer will be large enough to contain the data to be written.
//
// Any error HRESULT returned from this function will be passed back up
// the call stack.
//
// NOTE: Since the V1 library will not support write, it is OK not to
//       implement this.
//
typedef
CDECL
HRESULT
(*PFN_UMFS_WRITE_SECTOR)(
        PVOID           pvContext,
        ULONGLONG       ullStartOffset,
        ULONG           ulByteCount,
```

```
        PVOID              pvWriteBuffer
        );
//
// Function implemented by caller for control messages sent down from UMFS.
//
// Though currently unused, the umfs library will call into this function for
// a variety of control and informational messages.
//
// pvContext will point to the context supplied to the library when
// VOLUME_CONTEXT was passed to the library.
//
// ulControlMessage will indicate the type of message (none currently defined).
//
// ulControlPacketSize is the count in bytes of a control packet attached to the message.
//
// pControlPacket is the packet itself, which may be NULL if there is no packet for this type of
message.
//
// Any error HRESULT returned from this function will be passed back up
// the call stack.
//
// NOTE: this interface is currently unused.
typedef struct _UMFS_VOLUME_CONTEXT {
        //
        // Pointers to the read and write functions.
        //
        PFN_UMFS_READ_SECTOR      pfnReadSector;
        //
        // It is ok to specify NULL for pfnWriteSector, this means
        // the volume will be mounted read-only.
        //
        PFN_UMFS_WRITE_SECTOR     pfnWriteSector;
        //
        // User supplied context parameter.
        //
        PVOID                     pvContext;
        //
        // Physical parameters for the backing store.
        //
        ULONG                     ulSectorSize;
        ULONGLONG                 ullVolumeSize;      // in bytes
} UMFS_VOLUME_CONTEXT, *PUMFS_VOLUME_CONTEXT;
typedef struct _UMFS_CONTEXT_STRUCT *UMFS_CONTEXT,**PUMFS_CONTEXT;
typedef struct _UMFS_HANDLE_STRUCT  *UMFS_HANDLE,**PUMFS_HANDLE;
typedef struct _UMFS_ENUM_STRUCT    *UMFS_ENUM_CONTEXT,**PUMFS_ENUM_CONTEXT;
//
// Function to initialize the library.
//
// The caller must allocate and initialize a UMFS_VOLUME_CONTEXT structure
// and pass it in. The UMFS_VOLUME_CONTEXT structure must stay valid for
// as long as you use the library.
//
// It may be freed only after UmFsUninitialize is called.
//
// The function will allocate and return an opaque context structure
// representing the mounted filesystem.
//
// If the volume is unrecognized, this function will return failure
// HRESULT_FROM_WIN32( ERROR_UNRECOGNIZED_VOLUME )
//
EXTERN_C
HRESULT
UmFsInitialize(
        _inout          PUMFS_VOLUME_CONTEXT      pVolumeContext,
        _out            PUMFS_CONTEXT             pFilesystemContext
        );
//
// Uninitializes the UmFs library.
//
// Pass the address of the context, it will be cleaned up and then NULL'd
// on your behalf.
//
// If you have outstanding handles open, you will get
// HRESULT_FROM_WIN32(ERROR_DEVICE_IN_USE)
//
EXTERN_C
HRESULT
UmFsUninitialize(
        _inout_opt      PUMFS_CONTEXT             pFilesystemContext
        );
```

```
//
// Enumeration describing the currently supported filesystems in the
// library.
//
enum UMFS_TYPE {
    UMFS_TYPE_UNSUPPORTED,
    UMFS_TYPE_FAT16,
    UMFS_TYPE_FAT32,
    UMFS_TYPE_EXFAT,
};
typedef struct _UMFS_PROPERTIES {
    UMFS_TYPE       eFsType;
    WCHAR           wszVolumeLabel[MAX_PATH+1];
    ULONG           ulSerialNumber;
    ULONG           ulClusterSize;
} UMFS_PROPERTIES, *PUMFS_PROPERTIES;
//
// Function to get filesystem properties.
//
// Pass it an empty FS_PROPERTIES struct and it will fill it out.
//
EXTERN_C
HRESULT
UmFsQueryFilesystemProperties(
    _inout      UMFS_CONTEXT        FilesystemContext,
    _out        PUMFS_PROPERTIES    pUMFSProperties
    );
//
// Function to open a directory or a file by name.
//
// !!!!!!!!
//
// Note that opening by filename is unimplemted in V1 of the library.
// Please use UmFsOpenFileById.
//
// !!!!!!!!
//
// All directory opens are relative to ParentDirectoryHandle, although may be implemented
// to allow open via absolute path.
//
// . and .. will not be present in the directory listing.
//
// A file or directory may be opened more than once.
//
// A NULL ParentDirectoryHandle and a NULL pwszName indicates you
// want to open the root directory.
//
EXTERN_C
HRESULT
UmFsOpenFileByName(
    _inout      UMFS_CONTEXT        FilesystemContext,
    _inout      UMFS_HANDLE         ParentDirectoryHandle,
    _in         WCHAR               *pwszName,
    _out        PUMFS_HANDLE        pHandle
    );
//
// Function to open a directory or a file.
//
// All directory opens are relative to ParentDirectoryHandle, although may be implemented
// to allow open via absolute path.
//
// . and .. will not be present in the directory listing.
//
// A file or directory may be opened more than once.
//
// A NULL ParentDirectoryHandle and a NULL pwszName indicates you
// want to open the root directory.
//
EXTERN_C
HRESULT
UmFsOpenFileById(
    _inout      UMFS_CONTEXT        FilesystemContext,
    _inout      UMFS_HANDLE         ParentDirectoryHandle,
    _in         ULONGLONG           ullFileId,
    _out        PUMFS_HANDLE        pHandle
    );
//
// Cleans up any handle returned from the UmFs library.
//
// Pass the address of the handle, it will be cleaned up and then NULL'd on
```

```
// your behalf.
//
// Returns S_OK on success.
//
//
EXTERN_C
HRESULT
UmFsCloseFile(
    _inout_opt      PUMFS_HANDLE        pHandle
    );
//
// Structure describing a file.
//
typedef struct _UMFS_FILE_ENTRY {
    ULONG           ulFileAttributes;
    LARGE_INTEGER   liFileSize;
    FILETIME        ftCreated;
    FILETIME        ftModified;
    FILETIME        ftAccessed;
    ULONGLONG       ullFileId;                      // file ID
    WCHAR           wszFileName[MAX_PATH+1];        // null terminated
} UMFS_FILE_ENTRY, PUMFS_FILE_ENTRY;
//
// Returns the properties of a file or directory by handle.
//
// Can be used to determine if a file or directory was opened by looking at
// UMFS_FILE_ENTRY::ulFileAttributes.
//
EXTERN_C
HRESULT
UmFsQueryFileInformation(
    _inout          UMFS_HANDLE         Handle,
    _out            UMFS_FILE_ENTRY     FileInformation
    );
//
// Function that returns the contents of a directory.
//
// It is designed to be called in a loop until all the directory entries have
// been enumerated.
//
// The caller must allocate pFileEntryBuffer.
//
// The buffer size is passed in cbFileEntryBuffer. The buffer must be sizeof(UMFS_FILE_ENTRY)
//
// The function will fill out pFileEntryBuffer with a single fixed sized UMFS_FILE_ENTRY
// structure.
//
// The function will allocate and return pEnumContext, which is an opaque
// structure that is used to track the enumeration context.
//
// pEnumContext should be freed with UmFsCleanupEnumContext.
//
// Passing *pEnumContext == NULL starts the enumeration at the beginning
// of the directory.
//
// The function will return S_OK on success if the buffer has been filled
// and there are more files remaining. You must call it again to get the next
// file record, passing in the EnumContext to continue at the point
// it previously left off.
//
// The function will return S_FALSE, when the enumeration is complete and
// there are no more entries left.
//
// The function will return any failure HRESULT on failure.
//
#define UMFS_ENUM_RESTART       0x1
EXTERN_C
HRESULT
UmFsQueryDirectoryFileList(
    _inout                          UMFS_HANDLE             DirectoryHandle,
    _in                             ULONG                   ulFlags,
    _out                            PUMFS_FILE_ENTRY        pFileEntry,
    _inout                          PUMFS_ENUM_CONTEXT      pEnumContext
    );
//
// Cleans up any enumeration context structure returned from the UmFs library.
//
// Pass the address of the enum context, it will be cleaned up and then NULL'd on
// your behalf.
```

```
//
EXTERN_C
HRESULT
UmFsCleanupEnumContext(
    _inout_opt                                      PUMFS_ENUM_CONTEXT      pEnumContext
    );
//
// Returns a buffer of data from the file.
//
// The offset and length must be sector aligned.
//
// HRESULT S_OK is returned on success and the buffer is full.
//
// HRESULT S_FALSE is returned if the buffer is not full and EOF has been hit.
//
// HRESULT error on failure.
//
EXTERN_C
HRESULT
UmFsRead(
    _inout                                          UMFS_HANDLE     FileHandle,
    _in                                             ULONGLONG       ullByteOffset,       //
byte offset into the file
    _in                                             ULONG           cbLengthRequested,   //
length in bytes
    _out_bcount_part(cbLengthRequested, *pulBytesRead)  PBYTE       pbReadBuffer,        //
pointer to buffer
    _out                                            PULONG          pulBytesRead         //
bytes actually read
    );
```

Illustrative Code 2

The discovery volume management module 406 builds a discovery volume and associated cover files. Illustrative code for one implementation of the discovery volume management module 406 in the C language follows:

```
typedef struct _DISCOVERY_VOLUME_FILE_INFORMATION {
        WCHAR       sourcePath[MAX_PATH +1];    // path to source file, NULL terminated
        WCHAR       targetFile[MAX_PATH +1];    // name of target file, NULL terminated
                                                // (filename only, must be in root directory)
        DWORD       fileAttributes;             // file attributes.
        LARGE_INTEGER  byteOffset;              // filled out with the byte offset of the file
                                                // inside the image
        LARGE_INTEGER  allocationSize;          // size in bytes of the allocation for the file
} DISCOVERY_VOLUME_FILE_INFORMATION, *PDISCOVERY_VOLUME_FILE_INFORMATION;
HRESULT
CreateFAT32DiscoveryVolume (
                            ULONGLONG                               ullVolumeSize,
                            ULONG                                   ulSectorSize,
        _in_ecount(nFileInfo)  PDISCOVERY_VOLUME_FILE_INFORMATION    pFileInfo,
                            SIZE_T                                  nFileInfo,
                            DWORD                                   cbRecognitionInfo,
                            DWORD                                   *pdwOffsetRecognitionInfo,
                            HANDLE                                  hTargetFile
)
/*
Description:
Constructs a file containing an image of a FAT32 discovery volume.
The contents written to hTargetFile are the start of a FAT32 volume of volumeSize bytes. This includes
the boot area, FATs, root directory and any files supplied for inclusion in the filesystem. If this
image is then written to the leading bytes of a real volume of size volumeSize the result is a valid
FAT32 volume with the following properties:
-   The constructed volume will have a cluster size equal to or smaller than the clusterSize specified
(which must be the clustersize of the original volume).
-   The smallest possible volume is 64MB.
-   The largest possible volume is 2TB @ with 32k clusters (512 byte sectors).
-   The files in the fileInfo structs appear in the root directory with names set to
DISCOVERY_VOLUME_FILE_INFORMATION.targetFile
-   All the bytes in the volume beyond the constructed area are allocated to cover-files.
-   The cover-files appear in the root directory.
-   The cover-files have a prefix "COV "
-   The cover-files are numbered from 0000 to 9999.
-   The cover-files will each have the extension ". ER" <- note the space
-   Each cover file is up to 2^32 bytes - (1 cluster) bytes in size.
-   All files are read/only. The cover-files are also hidden & system.
-   There is no free space left on the volume.
```

- There is at least 8KB of free directory entries (for future servicing).
Parameters:
volumeSize - must contain the volume size in bytes of the target volume.
sectorSize - must contain the current sectorsize in bytesof the target volume.
clusterSize - must contain the current clustersize in bytes of the target volume.
fileInfo - pointer to an array of DISCOVERY_VOLUME_FILE_INFORMATION structs.
nFileInfo - count of DISCOVERY_VOLUME_FILE_INFORMATION structs.
cbRecognitionInfo - the length in bytes of the recognition info, up to 40 bytes.
pdwOffsetRecognitionInfo - returns the offset into the volume file where it is safe to write
        this recognition info
hTarget - handle to the target file where the volume is created.
Return Value:
On success returns S_OK, the image has been written to hTargetFile.
On failure returns a failure HRESULT. hTargetFile will be incomplete and should be deleted.
*/

Illustrative Code 1
Building a Discovery Volume and Cover Files

Figure 5:
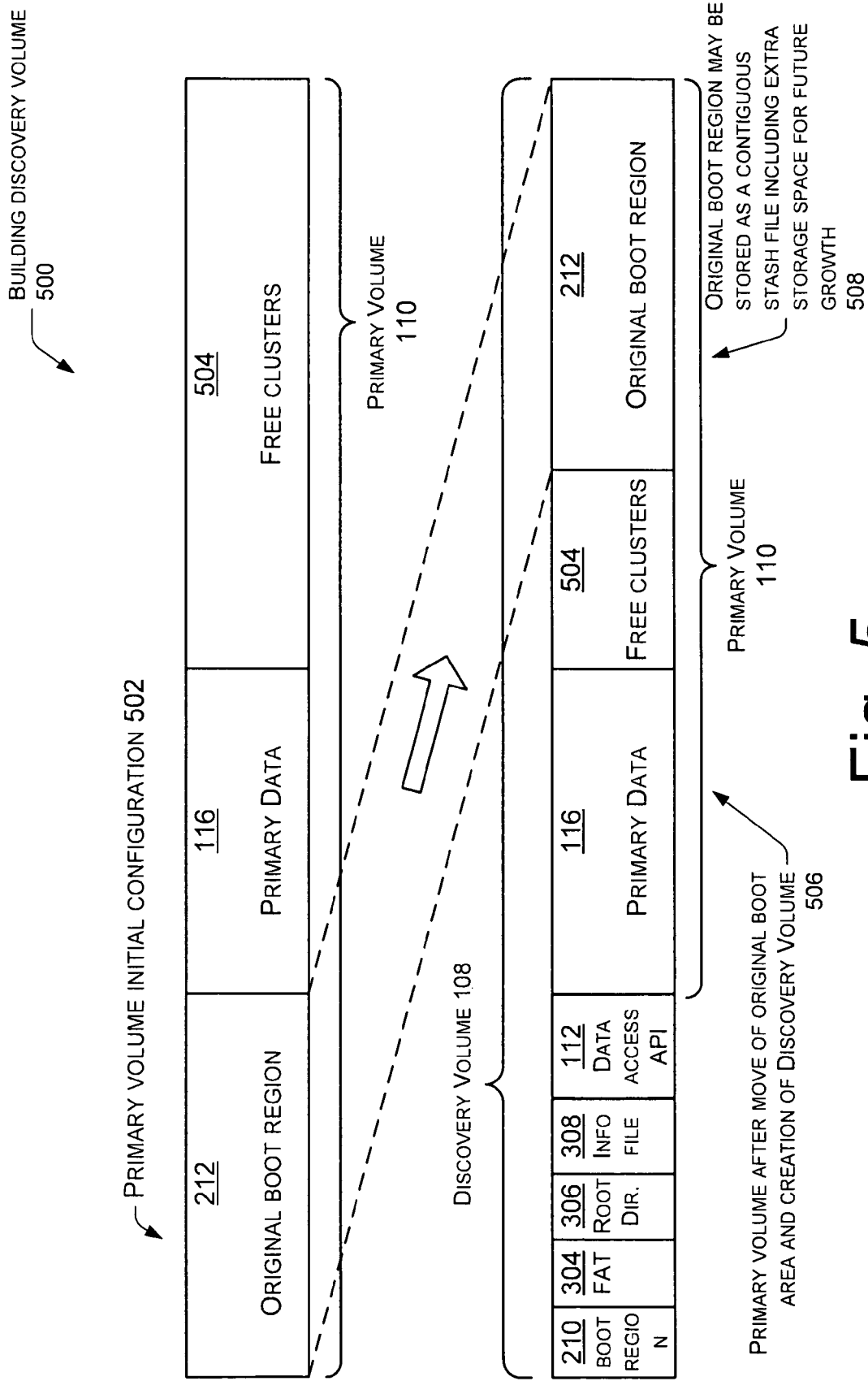
FIG. 5 is a diagram of an illustrative process of building a discovery volume.

FIG. 5 is a diagram of an illustrative process of building a discovery volume 500. At 502, a primary volume 110 of initial configuration is depicted, showing original boot area 212, primary data 116, and free clusters (or other free storage space within the storage device 106) 504. Using the discovery volume management module 406, the original boot area 212 is moved to within the free clusters 504 of the primary volume 110. The actual locations and relative positions of objects in a volume may vary.

At 506, the primary volume is shown after moving the original boot area and creating a discovery volume 108. Within discovery volume 108 is virtualized boot region 210, FAT 304, root directory 306, information file 308, data access API 112, and other components for the functionality of the discovery volume filesystem. The remainder of primary volume 110 comprises primary data 116, free clusters 504, and original boot area 212, which may be stored in a single stash file. This single stash file may be contiguous within the primary volume, and may contain additional space for future use 508.

Figure 6:
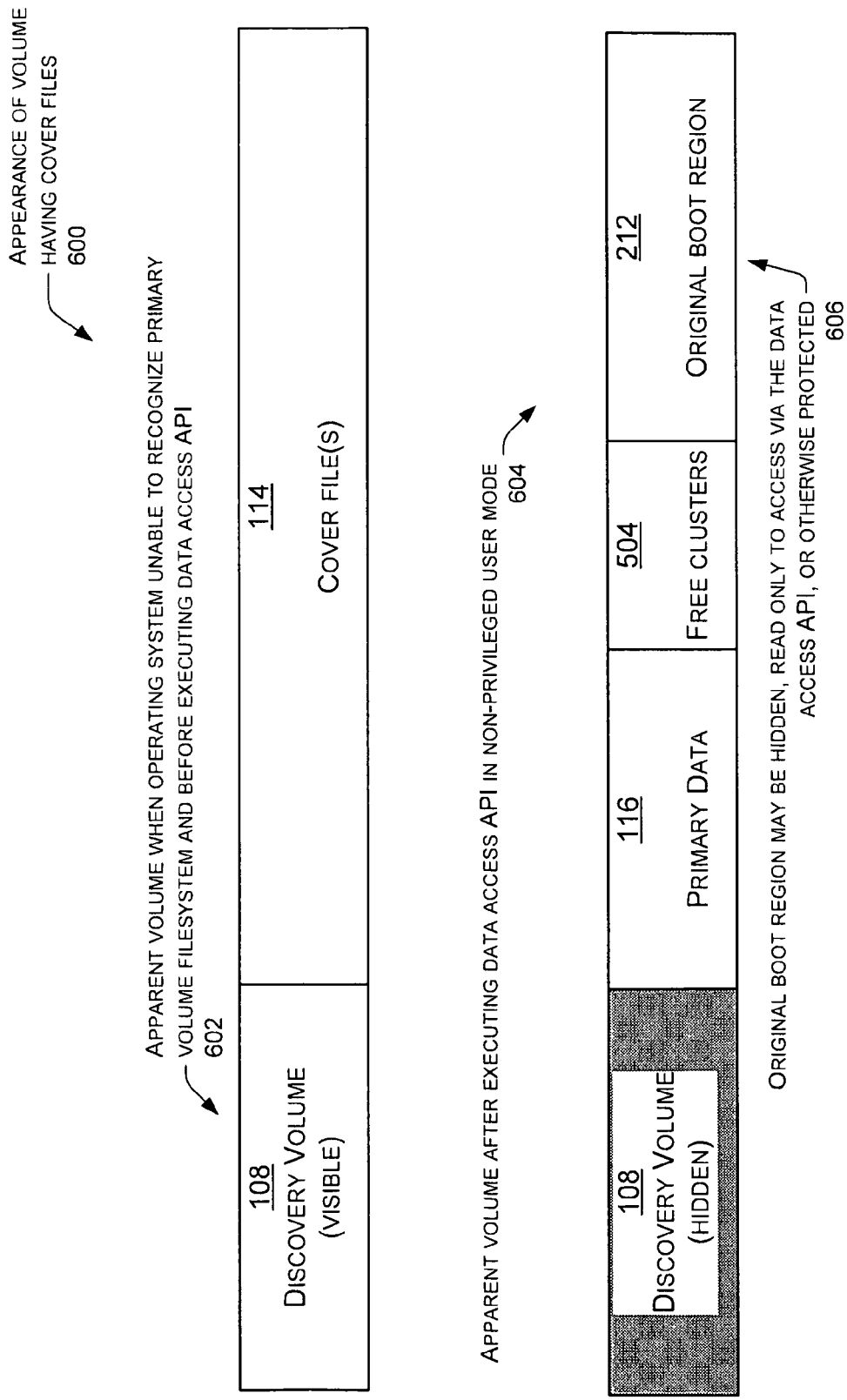
FIG. 6 is a diagram showing the appearance of a volume having a discovery volume and cover files before and after executing the data access API in a non-privileged user mode.

FIG. 6 is a diagram showing the appearance of a volume having a discovery volume and cover files before and after executing the data access API in a non-privileged user mode 600. At 602, the apparent volume is shown comprising the discovery volume 108 and the cover file 114 when the operating system is unable to recognize the primary volume filesystem and before executing the data access API in non-privileged user mode. Primary data 116 is not visible, nor are free clusters 504, which actually exist underneath the cover file 114 overlay.

At 604, the apparent volume is shown after executing the data access API in non-privileged user mode. The same operating system of 602 above is now able to access the discovery volume, the primary data 116, free clusters 504, and the original boot area 212. The original boot area 212 may be hidden, read only, have access restricted by the data access API, or otherwise be protected 606 from accidental change.

Appearance of Primary Volume with and without Cover Files

Figure 7:
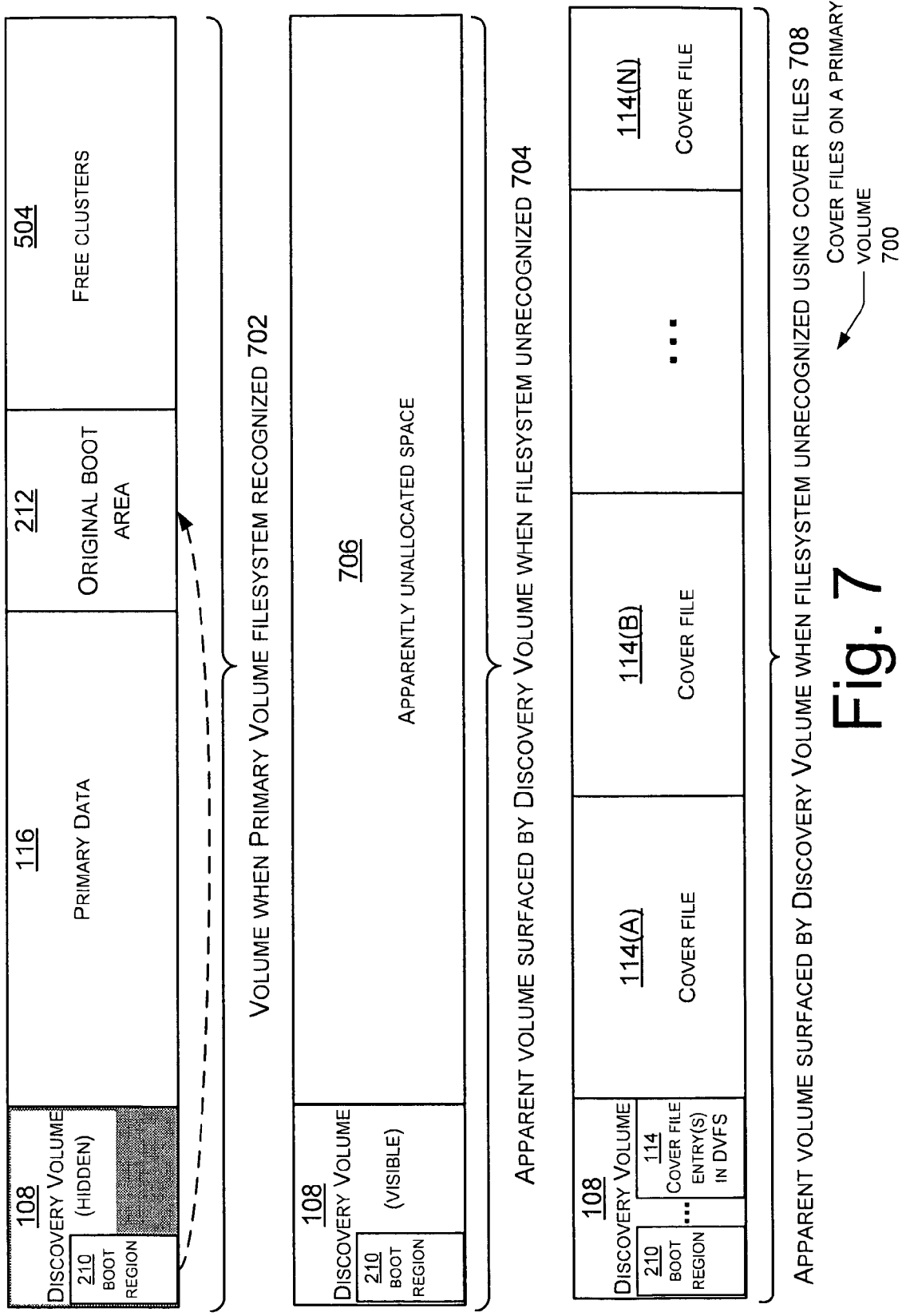
FIG. 7 is a diagram showing the appearance of a recognized primary volume, an unrecognized primary volume with and without cover files.

FIG. 7 is a diagram showing the appearance of a volume with and without cover files 700. At 702, when the primary volume filesystem is recognized, the primary data 116, original boot area 212, and free clusters 504 are visible. Discovery volume 108 and virtualized boot region 210 may be hidden, as indicated by the shading of discovery volume 108, with the pointers in boot region 210 redirecting actions to the original boot area 212. Original boot region 212 may also be configured to be the same size as discovery volume 108.

At 704, when the discovery volume is surfaced and no cover files are present, the portions of the volume containing the primary data 116, original boot area 212 and free clusters 504 appear to be apparently unallocated (or "raw") space 706. This unallocated space 706 may result in a prompt to a user to format, store files within, or make some other undesirable change to the volume, which would damage the actual data stored in a filesystem unrecognized by the accessing system.

At 708, cover file entries 114 are present in the discovery volume filesystem (for example, the FAT file listing). A cover file(s) presents a user with a discovery volume which, at 708, is apparently full. Thus, no prompt for reformatting is presented and, with no free space being shown as available in the discovery volume filesystem, the actual data under the cover files cannot be overwritten.

In another implementation, a discovery volume may be configured where the discovery file system does not extend over the entire volume. In this implementation, there are no cover files in the discovery volume and the discovery volume does not extend over the entire space allocated for the primary volume and reports itself as only consuming the space in the virtualized region. This implementation provides protection from accidental overwriting where an operating system does not typically permit multiple file systems within one volume.

This implementation may be used when non-privileged access to the primary file system through the cover files is unnecessary. For example, there may be a file in the discovery volume that describes to the user how to find and install software to enable access, or a tool may be present that will rewrite, transform, and/or convert the data structures on the disk to enable the accessing system to surface the data stored in the primary file system. In one implementation of this, the changes made by such a tool may be permanent, and the discovery volume may be erased in the process.

Building a Discovery Volume

Figure 8:
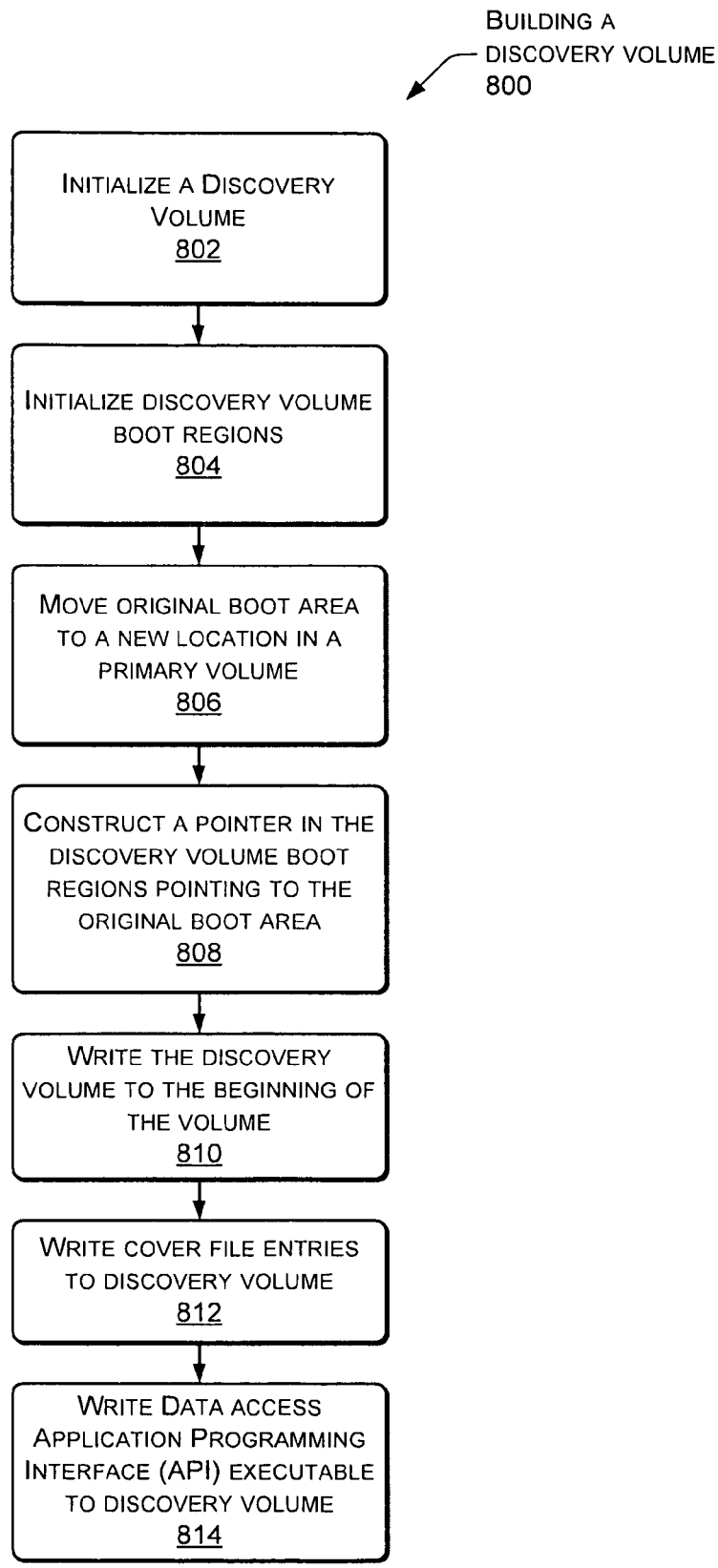
FIG. 8 is a flow diagram of an illustrative process of building a discovery volume including a data access API.

FIG. 8 is a flow diagram of an illustrative process of building a discovery volume including a data access API 800. The discovery volume creation module 406 may be used to implement these steps.

At 802, a discovery volume is initialized in memory. This discovery volume uses a filesystem which is visible to other operating systems. For example, the FAT filesystem is widely recognized across multiple operating systems and may be used.

At 804, a discovery volume boot region is initialized within the discovery volume. This discovery volume boot region is a virtualized boot region, that is, it contains the boot region information of the discovery volume filesystem, while including pointers to the primary volume filesystem. When the primary volume filesystem is recognized, the pointer allows the accessing system to redirect to the original boot area stored in the volume. When the primary volume filesystem is not recognized, the virtualized boot region provides access to the discovery volume filesystem.

At 806, the original real boot area is moved to a new location in the primary volume. For example, this location may be a single contiguous stash file, which is located anywhere except at the beginning of the volume in the boot sector(s).

At 808, a pointer is constructed in the discovery volume boot region, which points to the original boot area which contains original boot regions.

At 810, the discovery volume is written to the beginning of the volume. This placement in the beginning of the volume insures that an operating system will read the discovery volume boot regions, rather than the original boot area.

At 812, cover file entries are written to the discovery volume filesystem. These cover files are used to make the volume appear to be full of data when surfaced by the discovery volume.

At 814, a data access API including the access library module 404 is written to the discovery volume. Placement of the data access API into the discovery volume makes it visible and accessible to an accessing system which can read the discovery volume filesystem but not the primary filesystem. This data access API is configured to execute in user-mode and allow an operating system which cannot natively recognize the primary filesystem to recognize and access the primary volume data.

Accessing Primary Data on a Primary Volume

Figure 9:
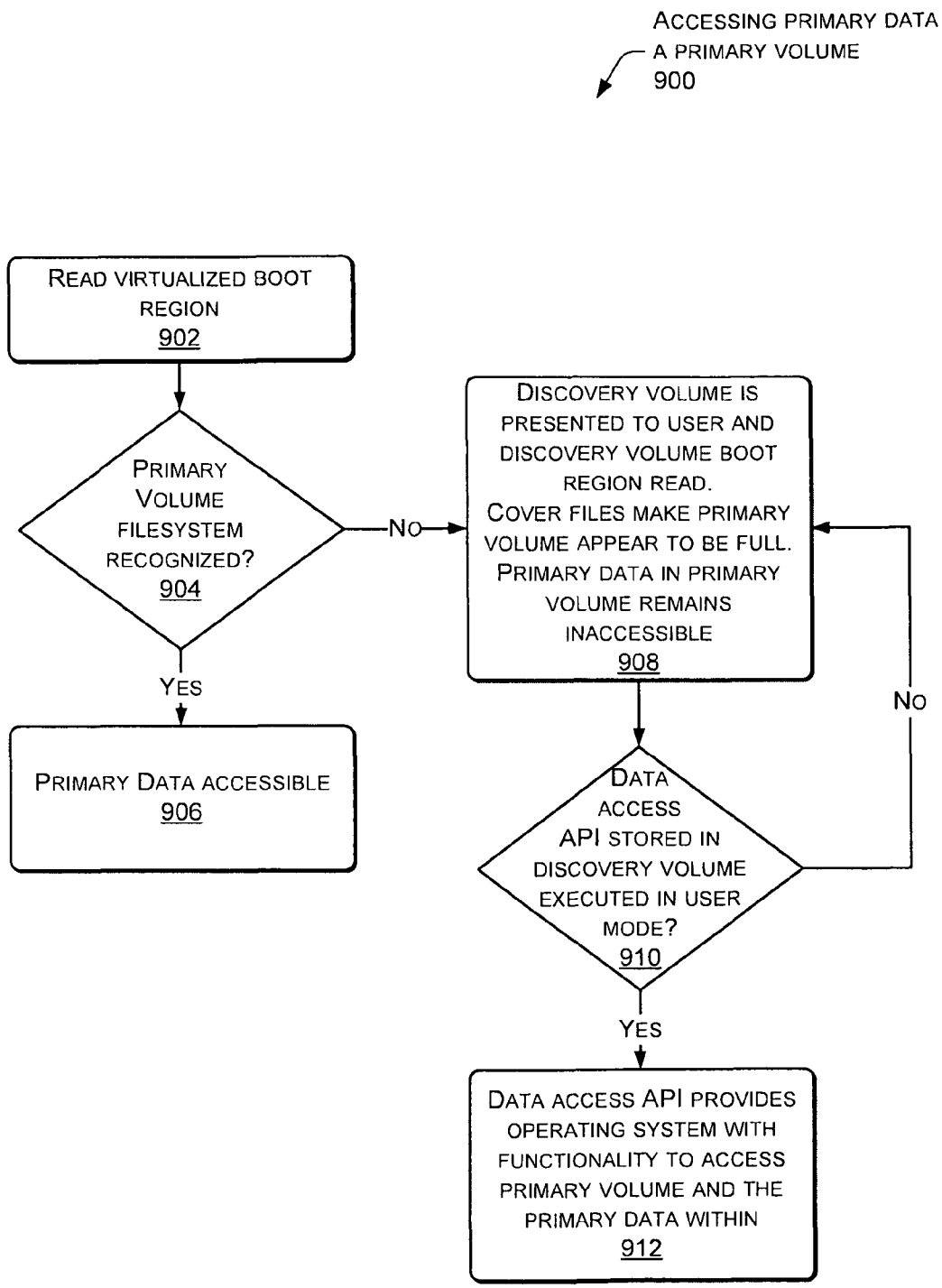
FIG. 9 is a flow diagram of an illustrative process of accessing primary data on a primary volume using the data access API.

FIG. 9 is a flow diagram of an illustrative process of accessing primary data on a primary volume using the data access API 900.

At 902, a virtualized boot region is read by the operating system.

At 904, when the primary volume filesystem is recognized by the operating system and, at 906, the primary volume and primary data are accessible.

When, at 904, the primary volume filesystem is not recognized, at 908, the discovery volume is presented to the user and the discovery volume boot region is read. Cover files make the primary volume appear to be full. Primary data in the primary volume remains inaccessible.

At 910, when the data access API stored in the discovery volume is executed in the non-privileged user mode of the operating system, at 912, the data access API access library module provides the operating system with the functionality to access the primary volume and the primary data within.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

We claim:

1. One or more computer-readable storage media storing instructions that, when executed, instruct a processor to perform acts comprising:
    calling a data access application programming interface (API), the data access API having an access library module and a discovery volume management module;
    building a discovery volume using the discovery volume management module, the building comprising:
        initializing the discovery volume having a discovery volume filesystem;
        implementing a primary volume in the discovery volume filesystem, the primary volume having a primary filesystem storing primary data;
        initializing a virtualized volume boot region in the discovery volume;
        moving contents of one or more original boot regions of the primary volume from a beginning of the discovery volume to a new location in the primary volume or creating a discovery volume boot region and writing the original boot region in the primary volume at a location other than the beginning of the discovery volume;
        constructing a pointer in the discovery volume boot region of the discovery volume pointing to a data structure containing information referring to an original boot region for the primary filesystem and writing the pointer to the discovery volume boot region;
        constructing at least one cover file entry in the discovery volume filesystem, the at least one cover file entry configured to present the discovery volume as full by claiming blocks used by the primary volume filesystem as being used in the discovery volume filesystem; and
    accessing the primary volume in a non-privileged user mode with the access library module of the API.

2. The computer-readable storage media of claim 1, further comprising returning contents of the original boot region when a read request comprising a boot region location is received.

3. The computer-readable storage media of claim 1, further comprising storing the data access API in the discovery volume.

4. The computer-readable storage media of claim 1, further comprising redirecting a write request to the virtualized volume boot region to the original boot region, such that the original boot region is written-to and not the virtualized volume boot region at the beginning of the volume.

5. One or more computer-readable storage media storing instructions that when executed instruct a processor to perform acts comprising:
    calling a data access application programming interface (API), the data access API having an access library module configured to execute in a non-privileged user mode and a discovery volume management module;
    employing the discovery volume management module to initialize a discovery volume boot region in a discovery volume, the discovery volume boot region including discovery volume boot information one or more pointers to one or more original boot regions;

initializing the discovery volume and a discovery volume filesystem, the discovery volume filesystem including at least one cover file entry configured to present the discovery volume as full;

accessing primary data stored in a primary volume of the discovery volume in the non-privileged user mode with the access library module of the API;

moving contents of the one or more original boot regions from a beginning of the discovery volume to a new location in the primary volume, or creating the discovery volume boot region and writing the one or more original boot regions at a location other than the beginning of the discovery volume; and constructing the one or more pointers pointing to at least one data structure containing information referring to the one or more original boot regions, and writing the one or more pointers to the discovery volume boot region in the discovery volume.

6. The computer-readable storage media of claim 5, wherein the discovery volume management module is configured to execute in the non-privileged user-mode.

7. The computer-readable storage media of claim 5, further comprising:

building the discovery volume with the discovery volume management module, the discovery volume having the discovery volume filesystem, the discovery volume filesystem containing the primary volume and having a primary volume filesystem storing the primary data.

8. The computer-readable storage media of claim 7, wherein the building further comprises constructing the at least one cover file entry in the discovery volume filesystem, the at least one cover file entry configured to claim blocks used by the primary volume as in use by the discovery volume filesystem.

9. The computer-readable storage media of claim 7, wherein the discovery volume filesystem comprises FAT12, FAT16, FAT32, exFAT, FATX, UDF, NTFS, ext2, ext3, ext4, or Tux3.

10. The computer-readable storage media of claim 5, wherein writing the one or more original boot regions in the primary volume comprises writing the one or more original boot regions to a single stash file within the primary volume.

11. The computer-readable storage media of claim 5, further comprising mounting the primary volume in the operating system in user-mode using the access library module of the API.

12. A system comprising:
a processor;
a memory coupled to the processor;
a data access application programming interface (API) stored in the memory and configured to execute on the processor;
an operating system stored in the memory and configured to execute on the processor; and
a storage device separate from the memory and coupled to the processor, the storage device storing a discovery volume having a discovery volume filesystem recognizable by the operating system and a primary volume within the discovery volume, the primary volume having a primary volume filesystem storing primary data unrecognizable by the operating system, wherein the discovery volume filesystem includes at least one cover file that is configured to present the discovery volume as apparently full, and wherein discovery volume further includes a virtualized boot region that includes a pointer to an original boot region stored in a stash file in the primary volume.

13. The system of claim 12, wherein the API further comprises an access library module configured to allow access to the primary volume when executed in a non-privileged user mode and a discovery volume management module configured to build a discovery volume when executed.

14. The system of claim 12, wherein the data access API is stored initially on the storage device and copied to the memory upon coupling of the storage device to the processor.

15. The system of claim 12, wherein the discovery volume comprises an information file comprising information about the primary volume.

16. The system of claim 13, wherein the discovery volume management module is configured to build the at least one cover file in the discovery volume filesystem, the at least one cover file comprising at least one entry in the discovery volume filesystem configured to claim blocks used by the primary volume as being used in the discovery volume filesystem.

17. The system of claim 13, wherein the access library module is configured to allow read and write operation to the primary volume.

* * * * *